W. Campbell,

Curtain Fixture.

No. 4232. Reissued Jan: 17. 1871.

Witnesses:

Wheeler W. Phillips

Hale N. Jones.

Inventor:

William Campbell

By Burke, Fraser & Osgood

Attys.

United States Patent Office.

WILLIAM CAMPBELL, OF NEW YORK, N. Y., ASSIGNOR TO NATHAN CAMPBELL.

Letters Patent No. 44,602, dated October 11, 1864; reissue No. 4,234, dated January 17, 1871.

IMPROVEMENT IN CURTAIN OR SHADE-FIXTUPES.

The Schedule referred to in these Letters Patent and making part of the same.

*To all whom it may concern:*

Be it known that I, WILLIAM CAMPBELL, of No. 19 Spruce street, in the city, county, and State of New York, did invent a new and useful Improvement in Shade-Fixtures; and I do hereby declare that the following is a full, clear, and exact description thereof, which will inable others skilled in the art to make and use the same, reference being had to the accompanying drawing forming part of this specification, in which—

Similar letters of reference indicate like parts.

This invention appertains to that part of window-shade fixtures which is employed for stopping the motion of the roller, so that the shade may be retained at any desired height; and It consists in certain mechanism for this purpose applicable to self-winding and other kinds of shades.

A represents a shade-roller of the kind which is provided with an internal spiral spring, B, and which may be made of wood or metal.

It is hung in the usual manner in brackets *a a'*, said spring having a tendency to rotate the roller A in the direction indicated by arrow 1, and thus wind up the shade C.

The roller A is provided at one end with a pulley, D, which may be a part of said roller, or, if separately formed, must be firmly attached to it, and which may or may not be smaller in diameter than the roller.

This pulley may be of wood or metal, and is preferably covered with India rubber, as shown at *b*, or other elastic material, to produce a yielding surface.

Figure 1:
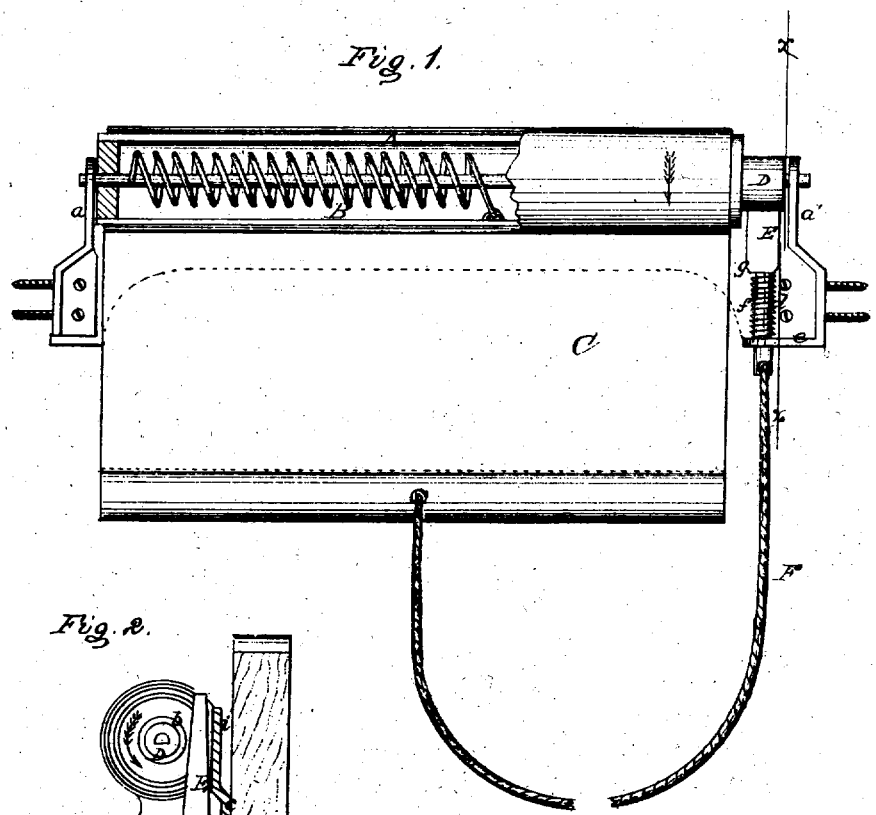
Figure 1 is a front view of my invention, partly in section.
Figure 2:
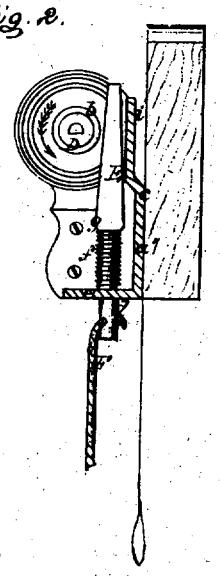
Figure 2 is a transverse section of the same, taken in the line X X, fig. 1.

The bracket *a'*, in which this end of the roller is fitted, is provided with an upright plate, *c*, having a raised bearing, *i*, directly back of the pulley D, and between the bearing and the pulley is interposed a vertical wedge, E, the beveled or inclined surface of which is preferably opposite to or faces the pulley D, as shown clearly in fig. 2.

This wedge E is provided with a cylindrical or other suitable-shaped shank, *d*, which passes through a horizontal projection, *e*, at the bottom of the bracket *a*, and has a spiral spring, *f*, upon it, said spring being between the projection *e* and a shoulder, *g*, formed by the lower thick end of the wedge E, and having a tendency to keep the wedge pressed upward so as to bind between the pulley D and the bearing *i*, and by its pressure against said pulley prevent the roller being turned and the position of the shade changed. This will be fully understood by referring to fig. 2, in which it will be seen that the rotating of the pulley D in the direction given it by the spring B would, by the friction of its yielding surface, have a tendency to move the wedge E into the space between it and the bearing *i*, causing it to press or bind firmly against the pulley until its motion is checked, and it will also be seen that if the pulley D be turned in the reverse direction it will release the wedge E and leave the roller free to turn on its axis for adjusting the shade.

The yielding or cushioned surface of the pulley D causes the clamping by the interposition of the wedge to be effectual, while effected in so easy and gradual a manner and without noise that its operation is preferable and far more agreeable than that of other stop mechanism.

The lower extremity of the shank *d* of the wedge E has a cord, F, attached to it by which the wedge E may be withdrawn to release the pulley D and admit of the roller being turned by the spring B, or the shade raised or lowered by any other means.

This forms a very efficient and economical stop for spring-shade rollers, and one that is noiseless in its operation and not liable to get out of repair or become deranged by use.

I claim as new and desire to secure by Letters Patent—

1. The wedge E and pulley D, in combination with the spring roller A, all arranged substantially as and for the purpose herein set forth.

2. The wedge-bearing *i*, in combination with the pulley D and wedge E, substantially as set forth.

3. The yielding cushion *b*, in combination with a shade-roller, for the purposes set forth.

WM. CAMPBELL.

Witnesses:
KATE N. JONES,
W. W. PHILLIPS.